US006219604B1

(12) United States Patent
Dilger et al.

(10) Patent No.: US 6,219,604 B1
(45) Date of Patent: Apr. 17, 2001

(54) STEER-BY-WIRE STEERING SYSTEM FOR MOTORIZED VEHICLES

(75) Inventors: Elmar Dilger, Leinfelden-Echterdingen; Peter Ahner, Boeblingen; Herbert Lohner, Friolzheim; Peter Dominke, Bietigheim-Bissingen; Chi-Thuan Cao, Korntal-Muenchingen; Ngoc-Thach Nguyen, Grossbottwar; Helmut Janetzke, Hemmingen; Thorsten Allgeier, Untergruppenbach; Wolfgang Pfeiffer, Grossbottwar; Bo Yuan, Ditzingen; Bernd Muller, Leonberg; Klaus Ries-Mueller, Bad Rappenau; Werner Harter, Illingen; Thomas Sauer; Werner Hess, both of Stuttgart; Peter Blessing, Heilbronn, all of (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/473,375

(22) Filed: Dec. 28, 1999

(30) Foreign Application Priority Data

Dec. 29, 1998 (DE) ............................................. 198 60 613
Mar. 18, 1999 (DE) ............................................. 199 12 169

(51) Int. Cl.⁷ .................................................. B62D 11/00
(52) U.S. Cl. ............................ 701/41; 701/42; 180/422; 180/443; 180/446
(58) Field of Search ........................ 701/41, 42; 180/422, 180/443, 446

(56) References Cited

U.S. PATENT DOCUMENTS

| | | | | |
|---|---|---|---|---|
| 5,247,441 | * | 9/1993 | Serizawa et al. | 364/424.05 |
| 5,347,458 | | 9/1994 | Serizawa et al. | 364/425.05 |
| 6,097,286 | * | 8/2000 | Discenzo | 340/465 |

FOREIGN PATENT DOCUMENTS 195 40 956
C1   11/1995   (DE) ................................ B62D/6/00

* cited by examiner

Primary Examiner—William A. Cuchlinski, Jr.
Assistant Examiner—Marthe Y. Marc-Coleman
(74) Attorney, Agent, or Firm—Baker & Daniels

(57) ABSTRACT

A steer-by-wire steering system comprised of an electronically regulated steering positioner mounted to the steering gear of the front axle or to both front wheels of a vehicle together with an electronic steering regulator and a feedback actuator. A sensor senses the driver's selected direction from the steering wheel. Road feedback can be relayed to the driver through a feedback actuator via the steering wheel. The loss of road feel caused by the absence of the steering column, which normally strongly influences the driver's directional wish, is recreated by the feedback actuator.

20 Claims, 7 Drawing Sheets

STEER-BY-WIRE STEERING SYSTEM FOR MOTORIZED VEHICLES

STATE OF THE ART

The invention is based on a steer-by-wire steering system for motorized vehicles having an electronically controlled steering positioner mounted to the steering gear of the front axle or to both of the steerable front wheels, a steering wheel sensor which picks up the desired driving direction at the steering wheel and transmits the road feel to the driver via the steering wheel by means of a feedback actuator unit.

Such a steer-by-wire steering system for motorized vehicles is known from DE 195 40 956 C1. This well-known steering system allows the driver to open the otherwise rigid mechanical drive connection between the steering wheel and a drive gear assembly on the vehicle's drive-controlled wheels by means of a clutch. This steering system thus is a steer-by-wire steering system where the steering wheel is only indirectly coupled to the drive gear assembly. To convey the road feel to the driver through the steering wheel, this solution provides for a manual positioner in the form of an anti-lock electric motor which, controlled by an electronic steering device on the steering wheel, effects a controllable actuation resistance.

A further steer-by-wire steering system, known from U.S. Pat. No. 5,347,458, utilizes a steering wheel positioner, which engages the steering wheel shaft, to imprint a reaction energy on the steering wheel which can be expressed as a mathematical function containing an acceleration term that is proportional to the angular acceleration of the steering wheel, a speed term proportional to the angular speed of the steering wheel, a proportional term proportional to the deflection angle of the steering wheel, and a constant term whose value is constant, but whose sign is dependent upon the direction of the deflection of the steering wheel from a neutral position. This reaction energy, which exerts a force on the steering wheel, is designed to provide the driver of the vehicle with an opposing force on the steering wheel, as he is accustomed to experience it from conventional steering systems, but is also intended to increase maneuverability and stability by transmitting information about the operational status of the vehicle to the driver via the steering wheel, allowing the driver to perform the appropriate steering maneuvers. By changing the coefficient—based on the various operational conditions of the vehicle, such as the vehicle speed—of at least one of the above-listed terms with regard to the mathematical function that is representative of the reaction energy, a reaction energy can be produced that is optimum in each special case of application.

OBJECT AND ADVANTAGES OF THE INVENTION

It is the object of the invention to provide a vehicle steering system that no longer features a mechanical or hydraulic coupling between the steering wheel and the steerable vehicle axle, but rather a steer-by-wire steering system capable not only of modifying the driver's desired direction as recorded by the steering wheel sensor while taking the data from the moving vehicle's handling dynamics into account, but which also improves the transverse dynamics by modifying the driver's desired direction, while simultaneously allowing for an individual response to a range of driver demands by adaptively recreating the manual torque relayed by the feedback actuator, thus generating adaptive nominal values for the steering wheel regulator.

The object of the invention is attained as stated in the patent claims. Based on the characteristics listed in the patent claims, the invention creates a steer-by-wire steering system for motorized vehicles which with regard to its functional realization has a flexible structure, is able to increase the steering comfort by a variable, speed-dependent steering angle transmission ratio and improve the transverse dynamics by means of modifications of the driver's desired direction depending on the vehicle's operational conditions, and to make it possible, by the adaptive recreation of the manual torque exerted on the steering wheel via the feedback actuator, to individually adapt to a range of different drivers' requirements, thus obtaining adaptive nominal values for the steering wheel regulator. The steer-by-wire steering system described in this invention makes it possible, for instance, to throttle engine power on poor road surfaces by monitoring the steering positioners' performance, and to provide haptic feedbacks to the driver through the steering wheel when the steering positioner is overloaded, including for instance the following cases:

- Changes in the steering counterforce in the presence of slippery road conditions, such as in hydroplaning, icy road surfaces, etc., or dependent on the friction coefficient of the road surface (determined, for example, by the control unit of the antilock brake system);
- Changes in the steering counterforce in the presence of skidding or rollover hazards (this data can for instance be relayed by the ESP control unit);
- An altered steering counterforce which may be encountered on poor roadways (the signal indicating a poor roadway can for instance be transmitted by the control unit of the antilock brake system);
- An alert by a quick jerking of the steering wheel, generated when the vehicle is operated in a faulty manner, such as when the maximum RPM's or the maximum vehicle speed are exceeded.

The above, as well as additional advantageous characteristics described in this invention, will be more closely discussed based on the preferred embodiments of the steer-by-wire steering system described in this invention in the explanatory description supported by drawings.

DRAWINGS

FIG. 1, in the form of a schematic block diagram, shows an illustration of a steer-by-wire steering system with a steering positioner equipped with the functions described in this invention;

FIG. 2 shows a schematic illustration of a steer-by-wire steering system with two steering positioners, equipped with the functions described in this invention;

FIG. 3A, in the form of function blocks, shows a speed-dependent, variable steering angle transmission ratio according to the invention;

FIG. 3B is a graphic representation of a monotonic function of the steer angle transmission ratio, dependent upon the driving speed, which can be recreated with the speed-dependent, variable steer angle transmission ratio;

FIG. 4, in the form of a block diagram, shows a configuration for improving the transverse dynamics by regulating the driving dynamics, which can be accomplished by means of the steer-by-wire steering system described in this invention;

Figure 7:
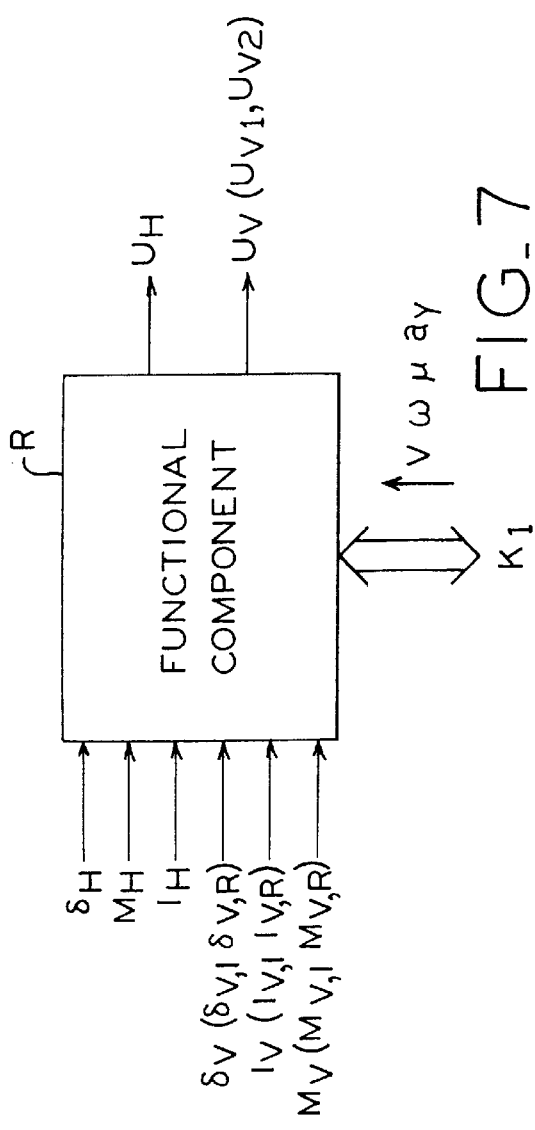
Figure 8:
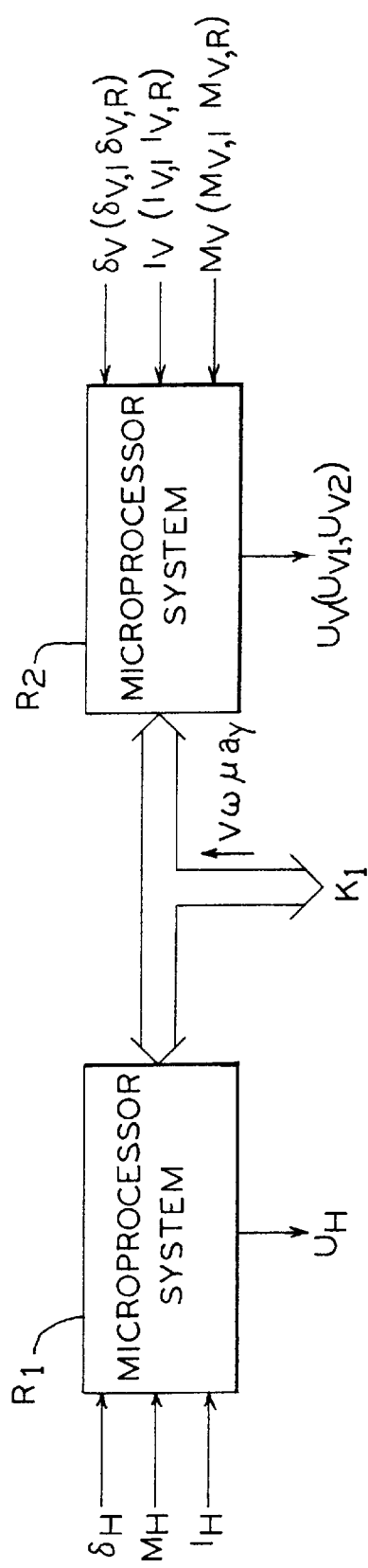

FIG. 7, in the form of a block diagram, shows a hardware structure of a microcomputer system which allows the control and regulating functions in the steer-by-wire steering system described in this invention to be executed; and FIG. 8, in the form of a block diagram, shows a hardware structure with two microcomputer systems which also allow the control and regulating functions of the steer-by-wire steering system described in this invention to be executed.

DETAILED DESCRIPTION OF EMBODIMENTS

Figure 1:
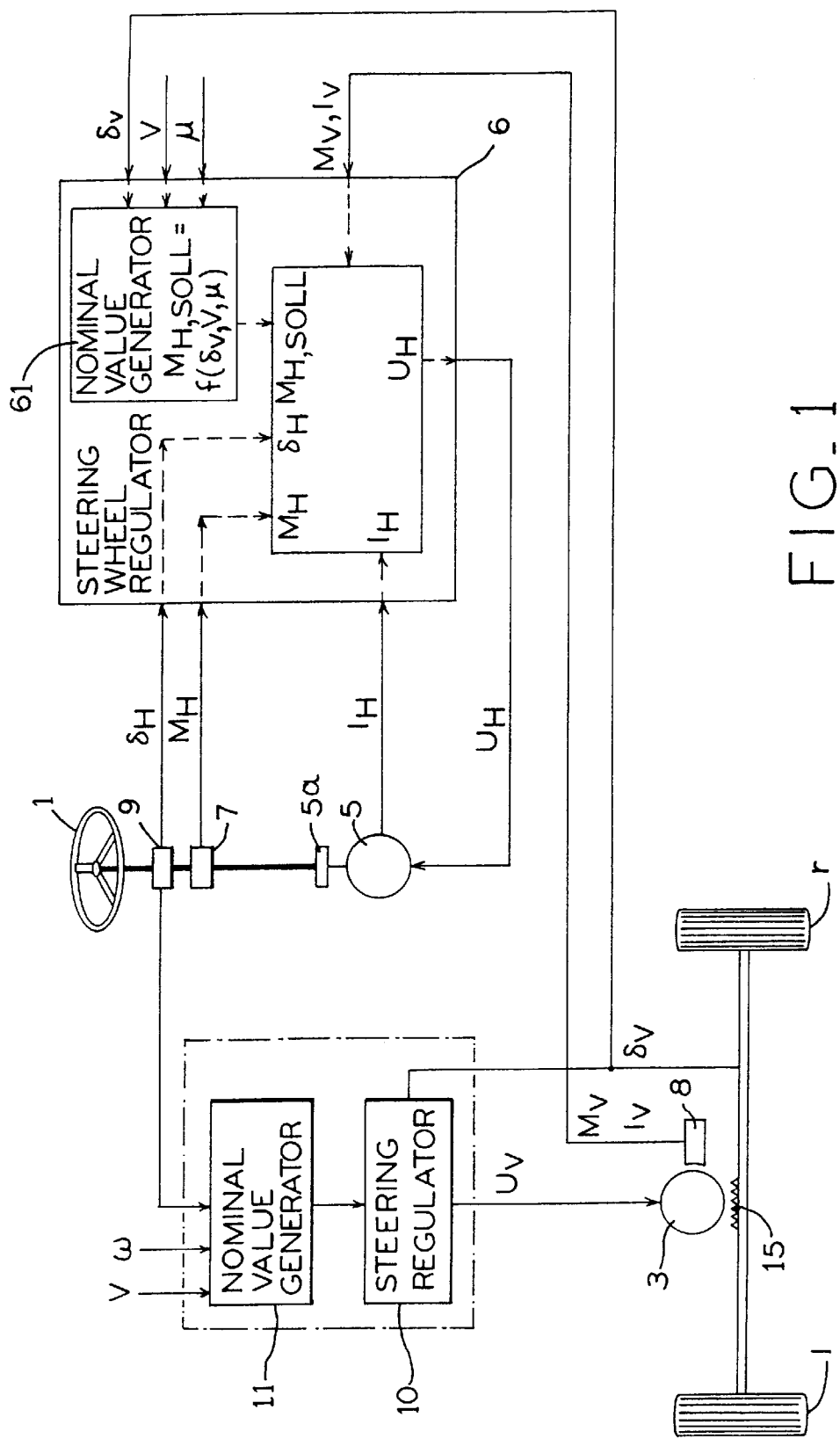
Figure 2:
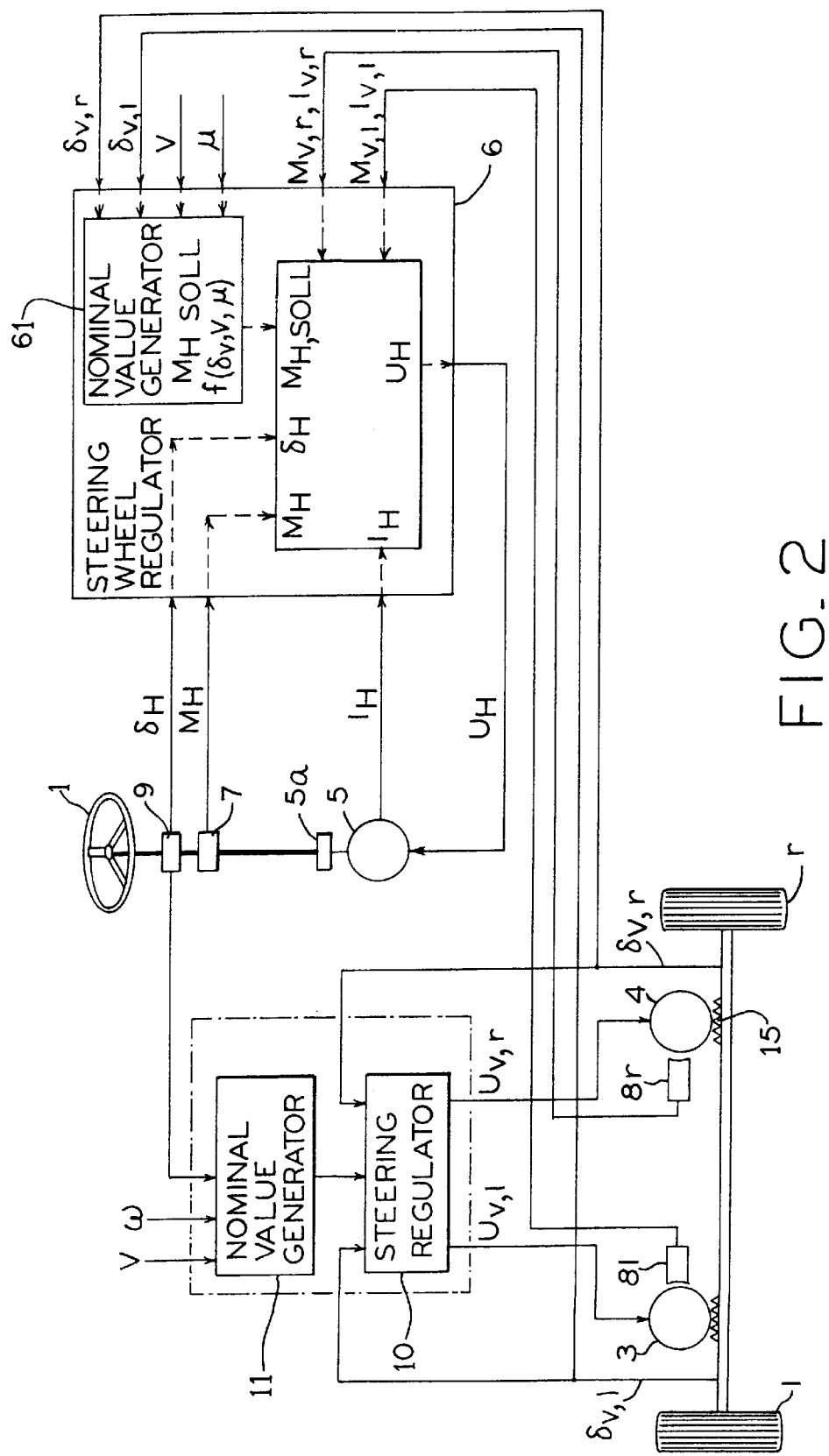

FIGS. 1 and 2 provide an overview, in the form of a schematic illustration, of a steer-by-wire steering system equipped with the functions described in this invention. The designation "steer-by-wire" points to the fact that the steering is not accomplished by means of the customary mechanical steering column, but is done electronically by means of a steering positioner. FIG. 1 shows the presence of only one steering positioner 3 in the form of an electric motor, which engages in the steerable front axle via a steering gear 15, while FIG. 2 shows a variation of the embodiment with engagements by two steering positioners 3 and 4 in the form of electric motors.

The driver's desired direction $\delta_H$, which he enters at the steering wheel 1 and which is received through a steering wheel angle sensor 9, is modified in a targeted manner by means of a nominal value generator 11 that is connected to an electronic steering regulator 10, depending on the situation and using dynamic values obtained from the moving vehicle, such as the vehicle speed v or the yaw velocity $\omega$ and which is then relayed to a steering regulator 10. An additional reading taken is the torque or steering wheel torque $M_H$ relayed by the driver to the steering wheel 1, which is measured by a torque sensor 7. In the version shown in FIG. 1, the steering positioner 3 engages the steerable front axle via a steering gear 15. In the version shown in FIG. 2, each front wheel is equipped with a steering positioner in the form of an electric motor 3, 4. In the latter case, the front wheels can be individually controlled, i.e. they need not always assume exactly the same steering angle. The electric motor 3 which serves as the steering positioner (FIG. 1) or, respectively, the electric motors 3 and 4 shown in FIG. 2, are controlled by the steering regulator 10 via output voltages of $U_v$, or $U_{v,l}$ and $U_{v,r}$, respectively.

The loss of road feel caused by the fact that the steering column is no longer rigidly connected to the steerable front axle, which in traditional steering systems is conveyed to the driver by the aligning torque, i.e. a manual torque on the steering wheel, and which strongly influences the driver's directional wish, is restored by means of a feedback actuator. The feedback actuator of the steer-by-wire steering system of this invention consists of a steering wheel positioner 5 coupled to the steering wheel 1 by means of a gear 5a, and a steering wheel regulator 6 designed to regulate the steering wheel positioner 5. The nominal manual torque $M_{H,soll}$ is generated by a nominal value generator 61 which functionally interacts with the steering wheel regulator 6. The nominal manual torque $M_{H,soll}$ is determined by the nominal value generator 61 on the basis of the aligning torques $M_v$ (or $M_{v,l}$ and $M_{v,r}$, respectively), or the currents Iv (or $I_{v,l}$ and $I_{v,r}$, respectively) obtained by the torque sensors or current sensors 8 or 8l and 8r which are mounted to the steering positioners 3 or, respectively, 3 and 4. Optionally, the nominal manual torque $M_{H,soll}$ can also be recreated by means of a feedback simulator based on the steering wheel angle $\delta_v$ (or, respectively, $\delta_{v,l}$ and $\delta_{v,r}$) determined by the steering angle sensor, as well as based on other signals already present in the vehicle, such as the vehicle speed v and the friction coefficient $\mu$ between road surface and tires. In addition to the nominal manual torque $M_{H,soll}$ determined in this manner, the steering wheel regulator 6 also receives other readings, such as the steering wheel torque $M_H$ measured by the torque sensor 7 that is coupled to the steering column, the steering wheel angle $\delta_H$ which is measured by the steering wheel angle sensor 9, the current $I_H$ obtained from the steering wheel positioner 5, and it provides the steering wheel positioner 5 with a voltage $U_H$ to regulate it.

Figures 3A, 3B:
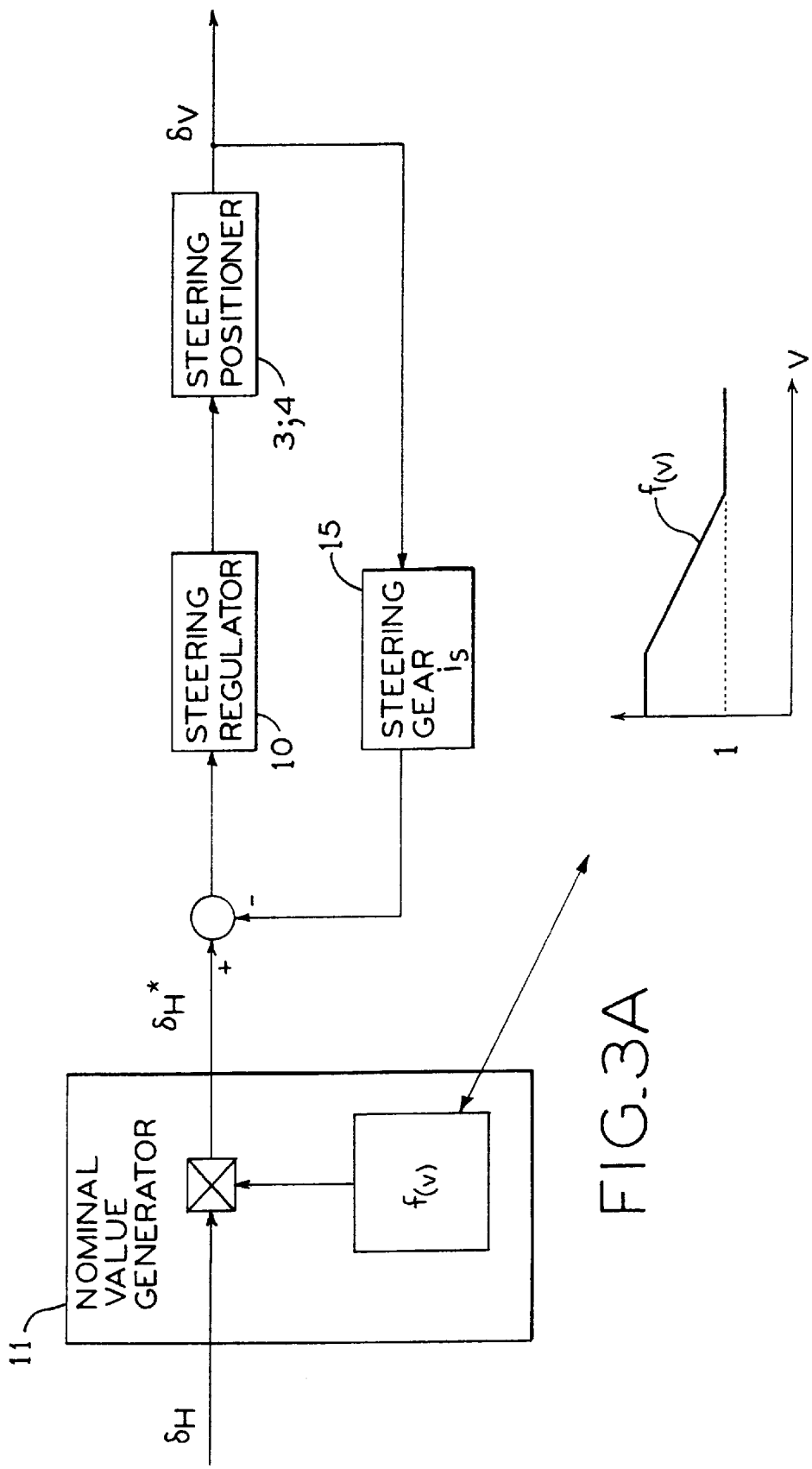

Using FIGS. 3A and 3B by way of illustration, the following is a description of how the nominal value generator 11 creates a situation-dependent nominal value for the steering regulator 10, as it adjusts the driving comfort by means of a speed-dependent variable steering angle transmission ratio.

The steering gear was designed to be constructed in such a way as to have a fixed steering angle transmission ratio $i_s$ (for example, 15 to 17). Under normal driving conditions at higher speeds, drivers generally consider this transmission ratio as pleasant. For more complicated maneuvers, however, it is desirable to be able to obtain wide wheel deflection angles while applying small steering wheel angles. This means that the steering wheel transmission ratio should diminish at lower speeds (for instance 8 to 10). This requirement can be met by the array shown in the sketch at FIG. 3A.

The desired driving direction $\delta_H$ is modified by means of a speed-dependent function f(v):

$$\delta_H{}^* = f(v) \cdot \delta_H \qquad (1)$$

This directional wish is relayed to the steering regulator as a new nominal value:

$$\delta_H{}^* = i_s \cdot \delta_v$$

This produces the following artificial result:

$$\delta_H = (i_s/f(v)) \cdot \delta_v$$

and a variable steering angle transmission ratio $$i_s{}^* = (i_s/f(v))$$

is thus realized.

The function f(v), for instance, can be a speed-dependent monotonic function as illustrated in FIG. 3B.

Figure 4:
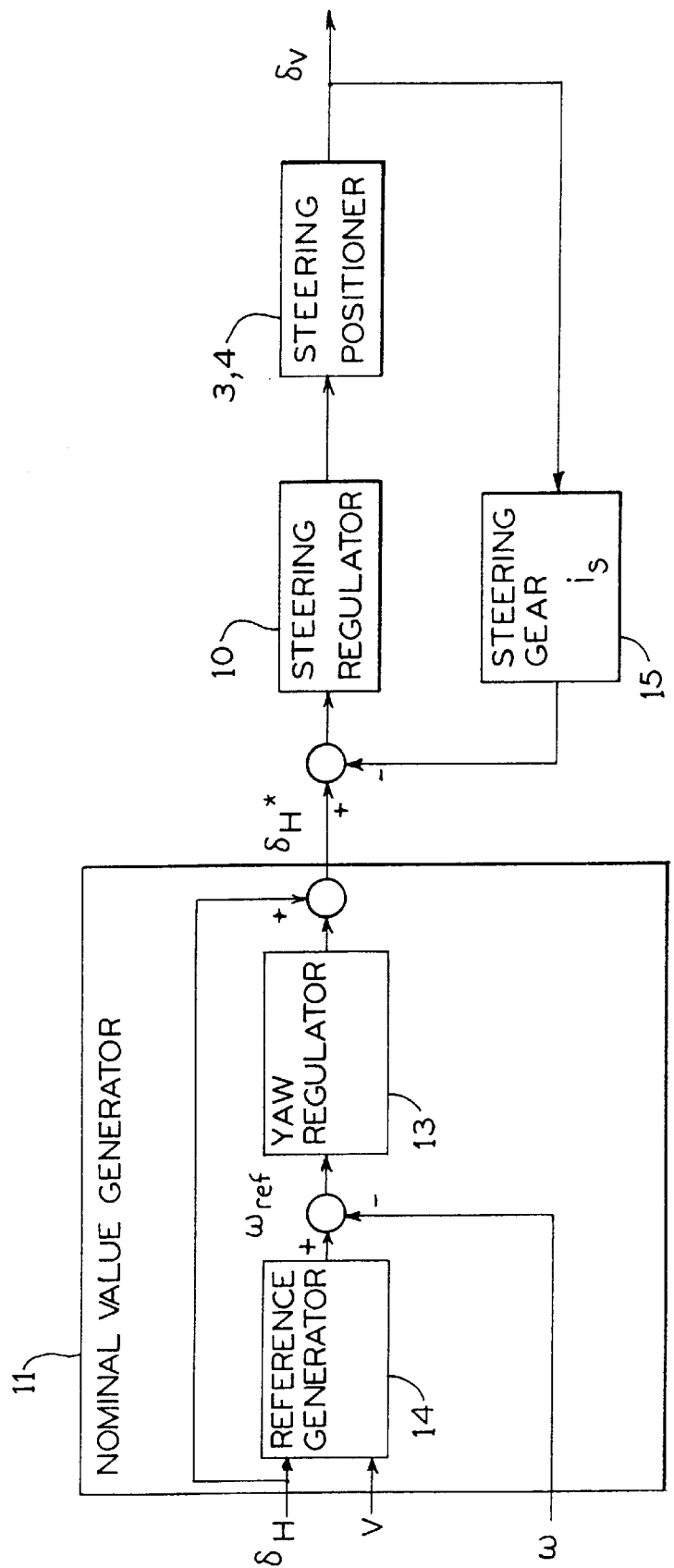

The creation of a situation-dependent nominal value for the steering regulator 10, generated by the nominal value generator 11 with the aim of improving the transverse dynamics by regulating the driving dynamics, is further described in the illustration of FIG. 4.

The array shown in FIG. 4, designed to improve the transverse dynamics by regulating the driving dynamics, adjusts the driver's directional wish $\delta_H$ by means of a yaw regulator in such a way that the desired yaw behavior can be maintained. A reference model in a reference generator 14 serves to provide the desired yaw comportment $\omega_{ref}$, $$\omega_{ref} = \left[ \frac{v}{l\left(1 + \frac{v^2}{v_{ch}^2}\right)} \cdot \frac{\delta_H}{i_s} \right] \cdot \frac{1}{1 + T_{ref} s}$$

wherein

-continued $\omega_{ref}$ = nominal yaw velocity   $l$ = wheel base
$v$ = speed   $T_{ref}$ = time constant
$v_{ch}$ = characteristic speed   $s$ = Laplace operator
($\approx 60\ldots100\,km/h$)

The yaw regulator 13 can be a standard PID regulator or a heavy-duty model follow-up controller. The resulting output of the yaw regulator 13 determines the driver's modified directional wish $\delta_H^*$.

When determining the driver's modified directional wish $\delta_H^*$ in vehicles with independent front wheel drive, the geometry of the inner and outer wheels also must be taken into consideration:

Inside: (3)

$$\delta_{H,i}^* = \left[\frac{R}{R-\left(\frac{b}{2}\right)}\right] \cdot \delta_H^*$$

Outside: (4)

$$\delta_{H,a}^* = \left[\frac{R}{R+\left(\frac{b}{2}\right)}\right] \cdot \delta_H^*$$

wherein
R=circular radius of the stationary circular course, and
b=distance between wheels,
whereby the circular radius R can be determined based on the speeds $v_i$, $v_a$ of the rear drive wheels:

$$R = \frac{b(v_a + v_i)}{2(v_a - v_i)} \quad (5)$$

wherein
$v_i$=speed of inside rear drive wheel
$v_a$=speed of outside rear drive wheel.

Instead of the nominal yaw velocity $\omega_{ref}$, it is also possible to use the nominal transverse acceleration of the vehicle $a_{y,ref}$ or a combination of these two values.

The steering regulator 10 (FIG. 1, FIG. 2) is a positional regulator which ensures that the wheel deflection angle on the front wheels follows the driver's modified directional wish $\delta_H^*$. The design of the steering regulator is highly dependent on the motor variants of the steering positioner and will not be further explained here. As a rule, the most suitable for this purpose are digital algorithms on the basis of a PID structure or digital adaptive regulator structures in general.

In vehicles with independent front wheel drive, the front wheels are steered by means of two separate control loops. In that case, the logical correctness of the nominal values of both control loops must be verified by means of a plausibility test.

The steering positioner is only designed for normal steering maneuvers. This design becomes critical when the vehicle is steered along a lengthy stretch of unpaved road or when the roadway is pitted with potholes. But this is tolerated to allow the engine dimensions to remain small. A temperature model which measures rising engine temperatures makes it possible to know when the engine is overheating. Measures, such as giving the steering wheel an appropriately modulated feedback (such as heavy steering) can then be taken, or the dynamics and with it the engine performance can be reduced.

The following is an explanation of how the manual torques on the steering wheel are determined.

The manual torque is determined and processed by measuring the torque or the current of the steering positioner. It can also be calculated by creating a model, using vehicle data (v, $\mu$, $\delta_v$, etc.) that are already known. It is also advantageous to combine the two methods.

A Model-Based Recreation of Manual Torques (Feedback Simulator)

Option 1

Using a vehicle model (in the simplest case, a "single track model"), the vehicle speed and the steering angle are used to calculate the yaw behavior of the vehicle and on that basis, the slip angles of the wheels. Using a tire model, the aligning torque on the front wheels is calculated. A rear-mounted steering column model (steering wheel, steering column, rack and pinion, tracking lever, power assist unit, etc., and taking into account friction and elasticities) allows the manual torque on the steering wheel to be calculated.

Option 2

A diagram stores characteristic parameters for a rear-mounted model of the steering characteristics, taking into account friction and elasticities in the steering system. The respective manual torques are calculated as a function of the diverse driving situations (speed, roadway friction, steering angle, etc.).

B Determining the Manual Torque by Measuring

The aligning torque is determined and converted by measuring the moments $M_y$, or $M_{yl}$, $M_{yr}$ on the front wheels, or measuring the steering positioner current $I_y$, or $I_{yl}$, $I_{yr}$. Following the respective processing and filtering, the aligning torque is projected onto a steering column model (see above), which allows the manual torque on the steering wheel to be calculated.

Figure 5:
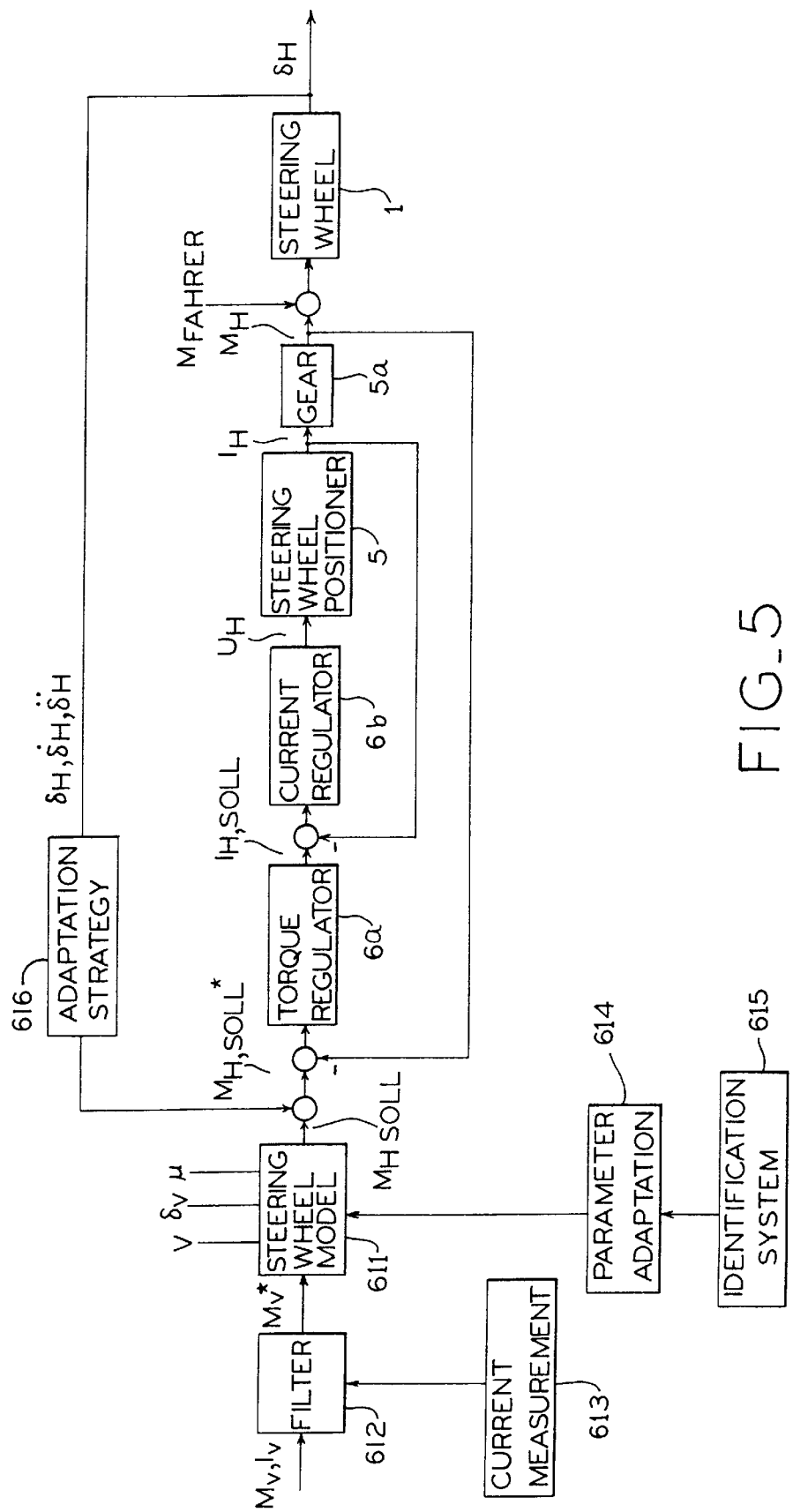
FIG. 5 shows schematically, in the form of a block diagram, the regulation of the feedback actuator which engages the steering wheel shaft in accordance with the invention.

FIG. 5 is a schematic illustration of the control loop of the feedback actuator. The core element of the steering wheel regulator 6 is an adaptive torque regulator 6a which ensures that the aligning torque of the tires is relayed to the steering wheel 1. The torque regulator 6a supplies a nominal current $I_{H,soll}$ to an internal current regulator 6b which drives the steering wheel positioner 5 (such as a D.C. motor) with a current $U_H$. In processing the nominal manual torque $M_{H,soll}^*$, the adaptation is achieved as follows:

The aligning torque $M_y^*$, determined by means of a torque measurement $M_y$, or a current measurement $I_y$ of the steering positioner, is processed and evaluated (Block 613). Road surface irregularities, vibrations, etc. can be eliminated by filtering 612. Significant torque changes which can occur when encountering changes in road surface types, icy road conditions, curbside wheel deflections, etc. are transferred to the steering wheel 1 unchanged.

In addition, by means of a parameter adaptation 614, the overall transfer behavior can be adapted to diverse driver demands by means of an identification system 615 designed to identify driver types, thus allowing for individualized steering comfort.

The manual torque $M_{H,soll}$, recreated on the basis of a steering wheel model 611, must finally be modified via an adaptation strategy 616 ($M_{H,soll}^*$), to allow the usual feedback to the steering wheel that is present in mechanical steering systems to be realistically recreated for the steer-by-wire vehicle.

The modified nominal steering wheel torque $M_{H,soll}^*$ is limited to a maximum torque rate in order to convey the kind of driving feeling expected in today's power steering systems. To reduce cost, weight and space requirements, the feedback actuator should only be able to transmit those forces which arise during the normal operation of a vehicle. Greater torques, such as those caused when the wheels are squeezed against or pushed away from a curb, can be fed back to driver in a different way (by a "haptic signal," such as a vibrating steering wheel).

Figure 6:
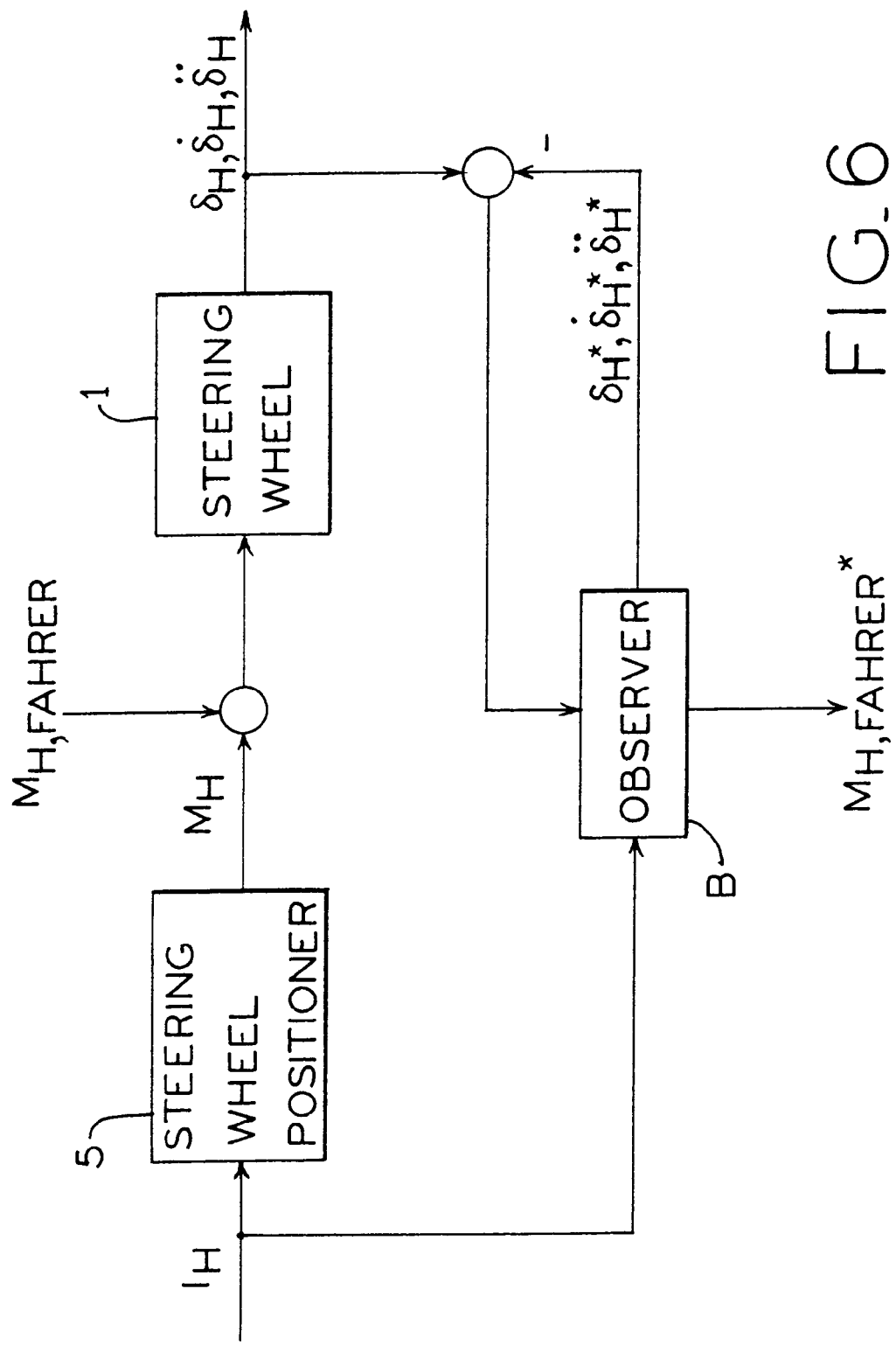
FIG. 6 shows schematically, in the form of a function block diagram, a monitoring system coupled to the feedback actuator according to FIG. 5.

FIG. 6 shows an observer B, who on the basis of the motor current $I_H$ and the steering wheel movement estimates which torques the driver is exerting upon the steering wheel. To do so the first and second derivations $\dot{\delta}_H$[1] and $\ddot{\delta}_H$[2] of the measured steering wheel angle $\delta_H^*$ are transmitted, forming differences to the respective values $\delta_H^*$, $\dot{\delta}_H^*$ and $\ddot{\delta}_H^*$ created by the observer B. This makes it possible to determine, for instance, whether the driver has his hand on the steering wheel or if he wants to override the system. The driver assistance functions which are superimposed on the steer-by-wire steering system require this information for their shut-off strategies.

[1]Translator's Note: In original German the δ has one dot above it.
[2]Translator's Note: In original German the δ has two dots above it.

FIGS. 7 and 8 show two different embodiments of the invention.

FIG. 7 shows an embodiment using a microcomputer system. The functional component R shown contains a microcomputer system along with peripheral components to record all of the sensor signals. It also includes the performance electronics required to create the control signal $U_H$ for the steering wheel positioner motor 5, or $U_v$ for the control of the steering positioner 3; 3, 4. The sensor signals or positioning values shown in parentheses apply to the embodiment variant of the steer-by-wire steering system with in dependent wheel suspension.

$K_1$ indicates a communication system realized, for example, by using a serial bus which makes it possible to hook up to other control devices, such as an antilock system control unit or an ESP control unit in the vehicle. By means of this communication system, the sensor signals for the yaw velocity ω and for the transverse acceleration $a_y$ are relayed to the microcomputer system. In addition, $K_1$ also serves to transmit estimated values for the friction coefficient $\mu$ between wheel and road and an estimated value of the vehicle speed v.

The embodiment version in FIG. 8 shows how the task of the steer-by-wire steering system is distributed between the two microprocessor systems $R_1$ and $R_2$, which again communicate via the system $K_1$. The functions to regulate the feedback actuator are realized in the microprocessor system $R_1$, while the microprocessor system $R_2$ regulates the desired steering angle, including the measures undertaken to improve the transverse dynamics described in connection with FIG. 4.

Inasmuch as the above-described steer-by-wire steering system is designed to provide the driver, by means of the feedback actuator, with feedback via the steering wheel 1, which depending upon certain operating conditions of the vehicle may also be modulated, the steering system of this invention is also suited to communicating the driver's faulty handling of the vehicle via the steering wheel 1 or through other operational elements of the vehicle. This ensures an additional measure of active safety in the vehicle's operation. Listed below are some cases where the steer-by-wire steering system of this invention is applied:

Changes in the steering counterforce on slippery road surfaces, such as hydroplaning, icy roads, etc., or dependent upon, for instance, the transferable friction coefficient at the road surface determined by the antilock system control unit;

Changes in the steering counterforce in the face of skidding or rollover hazards (this data can for instance be relayed by the ISP[3] control unit);

[3]sic—Translator's note.

Changes in the steering counterforce on poor road surfaces with potholes or washboard effect. The signal for a poor stretch of road is generated, among others, in the antilock system control unit, from where it can be relayed to the feedback actuator unit;

An alert by a quick jerking or vibration of the steering wheel, generated when the vehicle is operated in a faulty manner, such as when the maximum RPM's or the maximum vehicle speed are exceeded.

Utilizing the data available from the various interconnected systems (such as antilock braking systems, ESP or ACC [adaptive control restraint] systems, etc.) allows the aligning torque on the steering wheel to be altered for the driver's information. Error messages and alerts can also be conveyed to the driver via haptic feedback on the steering wheel (e.g., jerking).

An advantageous embodiment of the invention pertains to vehicles with adjustable suspension systems between the vehicle body and the individual wheels. These so-called called active chassis and/or chassis regulating or chassis steering systems make it possible, for instance, to adjust the distance between the vehicle body and the individual wheels, i.e. the vehicle level. Additionally, the suspension and/or shock-absorbing properties of the suspension systems, usually a combination of a suspension and a shock-absorbing element, can be individually and automatically adapted to the prevailing vehicle, driving and/or road conditions. Thus it is for instance possible to increase the shock absorption when the vehicle is more heavily loaded.

In the presence of such chassis systems, this embodiment of the invention makes it possible to determine the nominal manual torque as a function of the adjustment of the suspension systems, i.e. especially as a function of the distance between the vehicle body and the wheels, and the suspension and/or the shock absorption properties of the suspension systems between the body and the wheels. It is particularly advantageous here that the nominal manual torque increases as the shock absorption and/or the suspension hardness diminish. When there is light shock absorption, it is thus possible, by an increase in the manual torque, to communicate to the driver that he should not take a particular curve too fast. In addition, the manual torque can be chosen as a particular function of the vehicle's longitudinal speed. For example, the sensitivity of the manual torque can be set using a characteristic line or a characteristic diagram from the vehicle height (distance between vehicle body and wheels) and the longitudinal speed of the vehicle.

It is particularly advantageous that the steering wheel regulator is conceived in such a way that the manual torque being relayed to the steering wheel positioner is changed as a function of the abovementioned distance, the abovementioned suspension property, and/or the abovementioned shock absorption property.

A further advantageous embodiment of the invention refers to vehicles which have a tire inflation pressure gauge which records the air pressure in the vehicle tires at any given moment. In the present case, the nominal manual torque is designed to be determined as a function of the recorded air pressure. In particular, the steering wheel regulator has been conceived in such a way that it can modify the manual torque that is being fed to the steering wheel positioner, as a function of the recorded air pressure.

If the tire pressure falls (specifiable drop of air pressure), or if the tire pressure is too low (i.e. the air pressure lies below a specifiable or default threshold value), the driver can be given a manual torque signal, such as a jerking or vibration on the steering wheel, that he should not drive too fast, particularly when going into a curve. In addition, the manual torque can be chosen as a particular function of the vehicle's longitudinal speed. For example, the sensitivity of the manual torque can be set using a characteristic line or a characteristic diagram from the recorded tire pressure and the longitudinal speed of the vehicle.

What is claimed is:

1. A steer-by-wire steering system for a motorized vehicle, said vehicle including a front axle, a plurality of steerable wheels connected to said axle, an electronically controlled steering positioner, a steering gear, and a steering wheel, said system comprising:
   a steering wheel sensor for sensing a driver's selected direction from the steering wheel;
   a feedback actuator connected to the steering wheel for providing road feedback to a driver, said actuator including a steering wheel positioner and steering wheel regulator;
   a torque sensor and a current sensor, both said torque sensor and current sensor connected to said steering wheel regulator for determining aligning torques and aligning currents;
   a steering regulator connected to said steering positioner;
   a nominal value generator connected to said steering regulator, said steering regulator and nominal value generator modifying a driver's selected direction as a function of a moving vehicle's handling dynamics and generating a nominal value for the steering positioner, said steering regulator determining a nominal manual torque for a driver as a function of simulated aligning torques derived from one of aligning torques and aligning currents, from signals measured by said steering wheel sensor and from operational status signals of said vehicle including driving speed, the co-efficient of friction between the road and vehicle, and wherein the nominal manual torque is used as the basis of the manual torque transferred to the steering wheel through the steering wheel positioner.

2. The steer-by-wire steering system according to claim 1 wherein the electronic steering regulator produces a variable steering angle transmission ratio as a function of the driver's selected direction in accordance with the following relation:

$$\delta_H^* = f(v) \cdot \delta_H,$$

and wherein $\delta_H^*$ is relayed to the steering regulator as the new nominal value.

3. The steer-by-wire steering system according to claim 1 wherein the electronic steering regulator varies the steering angle transmission ratio by means of a function which is a monotonous function of driving speed.

4. The steer-by-wire steering system according to claim 1 including a yaw regulator connected to the steering regulator, said yaw regulator modifying the driver's selected direction as a function of the dynamics of the moving vehicle whereby the desired yaw behavior of the vehicle if obtained.

5. The steer-by-wire steering system according to claim 1 wherein the yaw regulator connected to a reference generator which provides a default for the desired yaw behavior according to the following relation:

$$\omega_{ref} = \left[ \frac{v}{l\left(1 + \frac{v^2}{v_{ch}^2}\right)} \cdot \frac{\delta_H}{i_s} \right] \cdot \frac{1}{1 + T_{ref}s}$$

wherein $\omega_{ref}$ = nominal yaw velocity  $l$ = wheel base
$v$ = speed  $T_{ref}$ = time constant
$v_{ch}$ = characteristic speed  $s$ = Laplace operator ($\approx 60 \ldots 100$ km/h)

6. The steer-by-wire steering system according to claim 1 including two steering positioners for controlling individual wheels, the yaw regulator executing the modification of the driver's selected direction as a function of the geometry of the inside-curve and outside-curve wheels according to the following relation:

Inside:

$$\delta_{H,i}^* = \left[ \frac{R}{R - \left(\frac{b}{2}\right)} \right] \cdot \delta_H^*$$

Outside:

$$\delta_{H,a}^* = \left[ \frac{R}{R + \left(\frac{b}{2}\right)} \right] \cdot \delta_H^*$$

wherein b is the equidistance of the wheels, the circular radius R can be determined and based on speeds V1, Va, according to the following relation:

$$R = \frac{b(v_a + v_i)}{2(v_a - v_i)}.$$

7. Steer-by-wire steering system according to claim 1 wherein a feedback simulator calculates the yaw behavior of the vehicle as a function of the driving speed and the steering angle, calculates the slip angles of the wheels, and calculates the aligning torque on the front wheels, and wherein a steering column model rear-mounted to a vehicle model calculates a nominal manual torque on the steering wheel, taking into account friction and elasticity present in the steering wheel.

8. Steer-by-wire steering system according to claim 1 wherein a feedback simulator stores a map with characteristic parameters for a rear-mounted model of steering characteristics, and calculates respective nominal manual torques for communication to the steering wheel positioner on the basis of diverse driving situations.

9. Steer-by-wire steering system according to claim 1 wherein, in order to determine a nominal manual torque, the steering wheel regulator converts one of the aligning torque measured at the front wheels and the aligning current measured at the steering positioner and relays it to a steering column model that is rear-mounted to the steering wheel regulator, which calculates the nominal manual torque relayed to the steering wheel positioner.

10. Steer-by-wire steering system according to claim 1 wherein the steering wheel regulator limits the resulting manual torque to a specific maximum value in order to convey the kind of driving feeling that is customary in power steering systems.

11. Steer-by-wire steering system according to claim 1 wherein the steering wheel regulator signal overloads of the steering positioner by means of a tactile signal relayed to the steering wheel via the steering wheel positioner.

12. Steer-by-wire steering system according to claim 1 wherein the vehicle and the control of other functions of the vehicle are adapted to be accomplished by one of an antilock, an automatic traction control, a straight-line stability and adaptive control constraint, an engine management, a chassis steering, chassis control recorder, and a tire inflation pressure recorder, whereby the steering wheel regulator is fed data generated by the control unit, while the nominal manual torque continues to be determined based on these values.

13. Steer-by-wire steering system according to claim 12 wherein the chassis steering and the chassis regulating system control the distance between the body and the wheels of the vehicle and the suspension and shock absorption properties of the suspension systems between the body and the wheels, and the nominal manual torque is determined as a function of a distance, a suspension property and a shock absorption property, whereby the nominal manual torque is increased as the shock absorption and the suspension hardness is diminished.

14. Steer-by-wire steering system according to claim 12 wherein the chassis steering and the chassis regulating system control the distance between the body and the wheels of the vehicle and the suspension and shock absorption properties of the suspension systems between the body and the wheels, and that the steering wheel regulator is adapted to modify the manual torque transmitted to the steering wheel positioner as a function of distance of distance, suspension property and shock absorption property.

15. Steer-by-wire steering system according to claim 12 including a tire inflation gauge which reads the current air pressure in the vehicle tires, and the nominal manual torque is determined on the basis of the recorded air pressure.

16. Steer-by-wire steering system according to claim 15 wherein the steering wheel regulator is adapted to modify the manual torque relayed to the steering wheel positioner as a function of the recorded air pressure, whereby vibration and jerking motion on the steering wheel if the air pressure is below a specifiable or default threshold value and falls at a specifiable rate are inhibited.

17. Steer-by-wire steering system according to claim 1 wherein the steering wheel regulator is adapted to modify the manual torque relayed to the steering wheel positioner on the basis of a friction coefficient of the road surface as determined by an antilock system control unit under slippery road conditions.

18. Steer-by-wire steering system according to claim 1 wherein the steering wheel regulator is adapted to modify the manual torque relayed to the steering wheel positioner on the basis of data generated in an electronic control unit which warns of the danger of the vehicle overturning or going into a skid.

19. Steer-by-wire steering system according to claim 1 wherein the steering wheel regulator is adapted to modify the manual torque relayed to the steering wheel positioner when the antilock system control unit identifies poor road conditions.

20. Steer-by-wire steering system according to claim 1 wherein the steering wheel regulator is adapted to generate a signal by means of the manual torque to indicate improper handling conditions of the vehicle selected from the maximum RPM's, the maximum speed of the vehicle is exceeded, and when it is driven on a nearly empty tank.

* * * * *